Aug. 16, 1932.　　　　P. BOYD　　　　1,872,235
APPARATUS FOR MAKING BUTT-WELD PIPE
Filed Aug. 23, 1928　　7 Sheets-Sheet 7
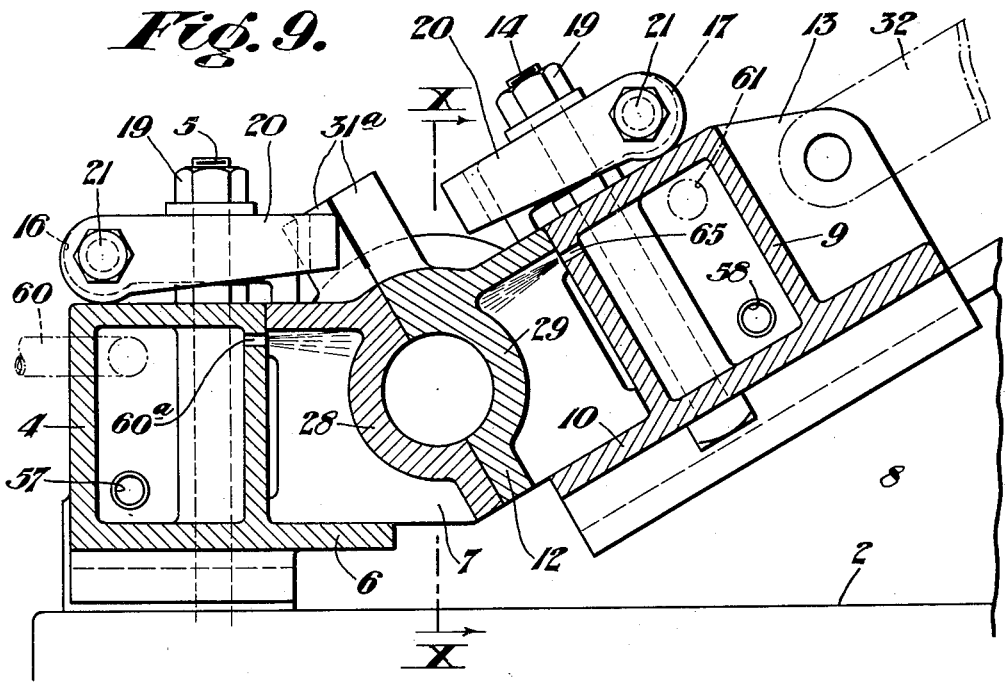
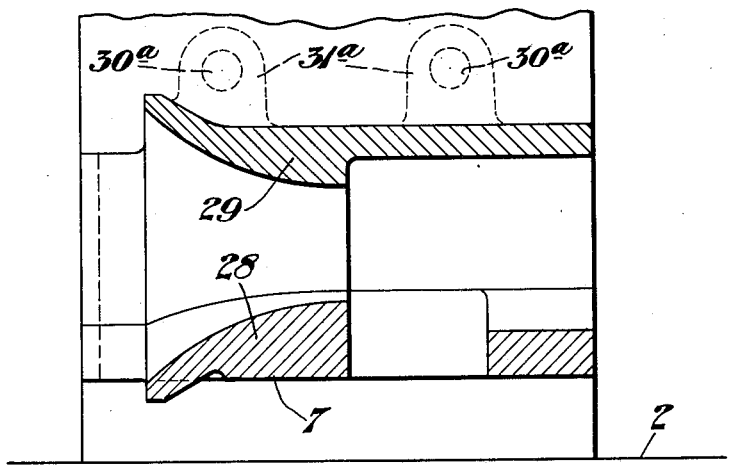
Inventor:
PETER BOYD,
by D. Anthony Usina
his Attorney.

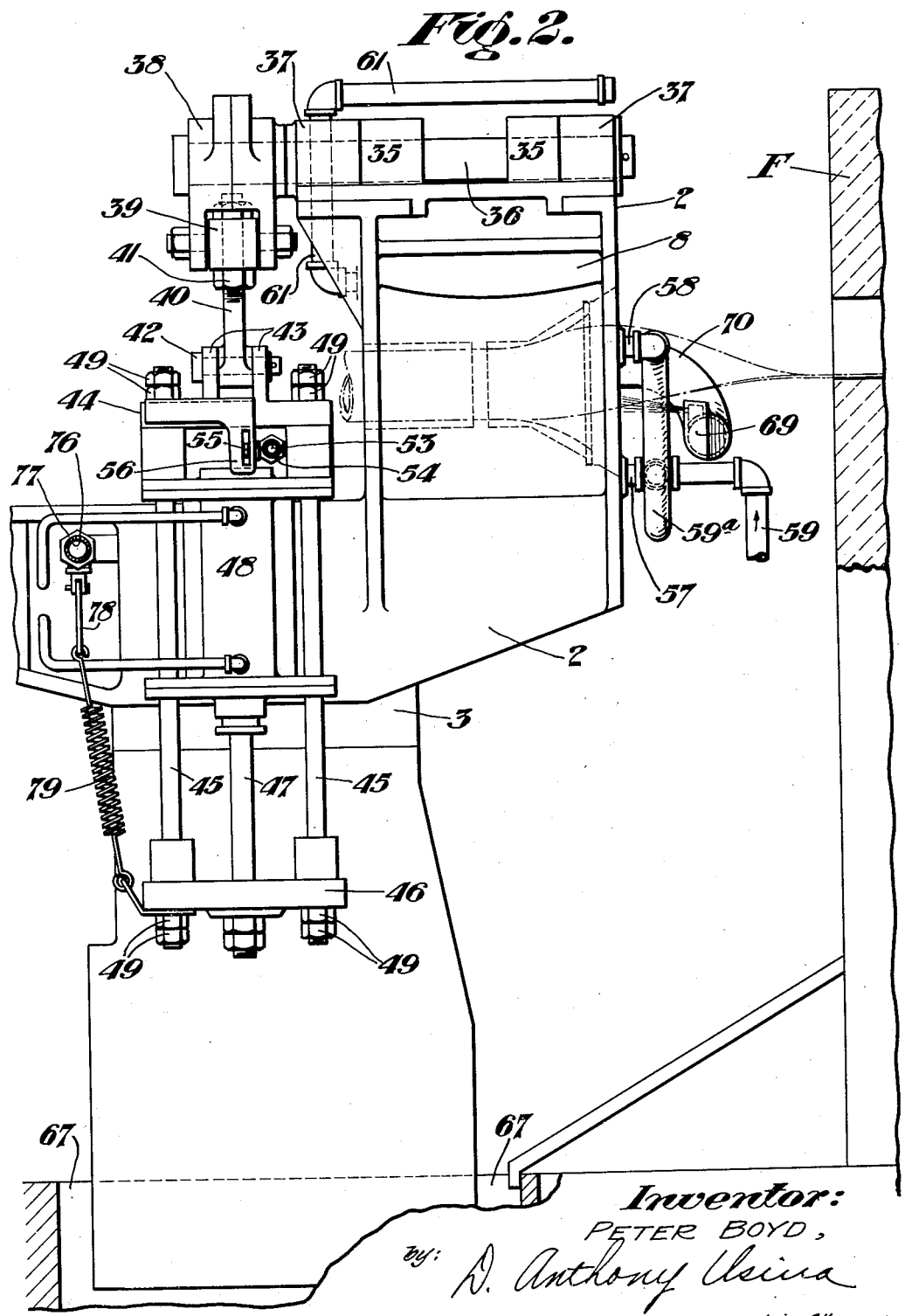

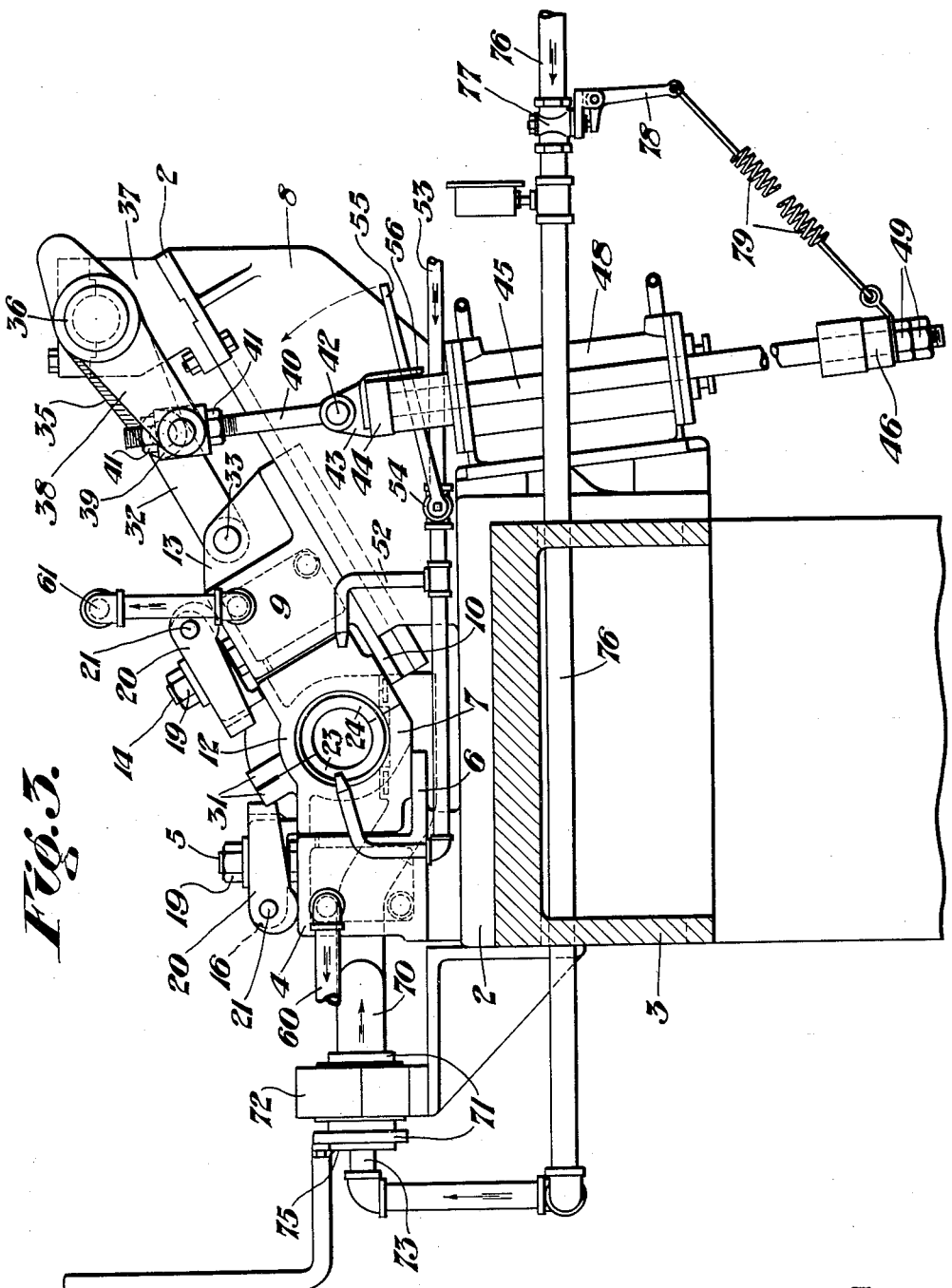

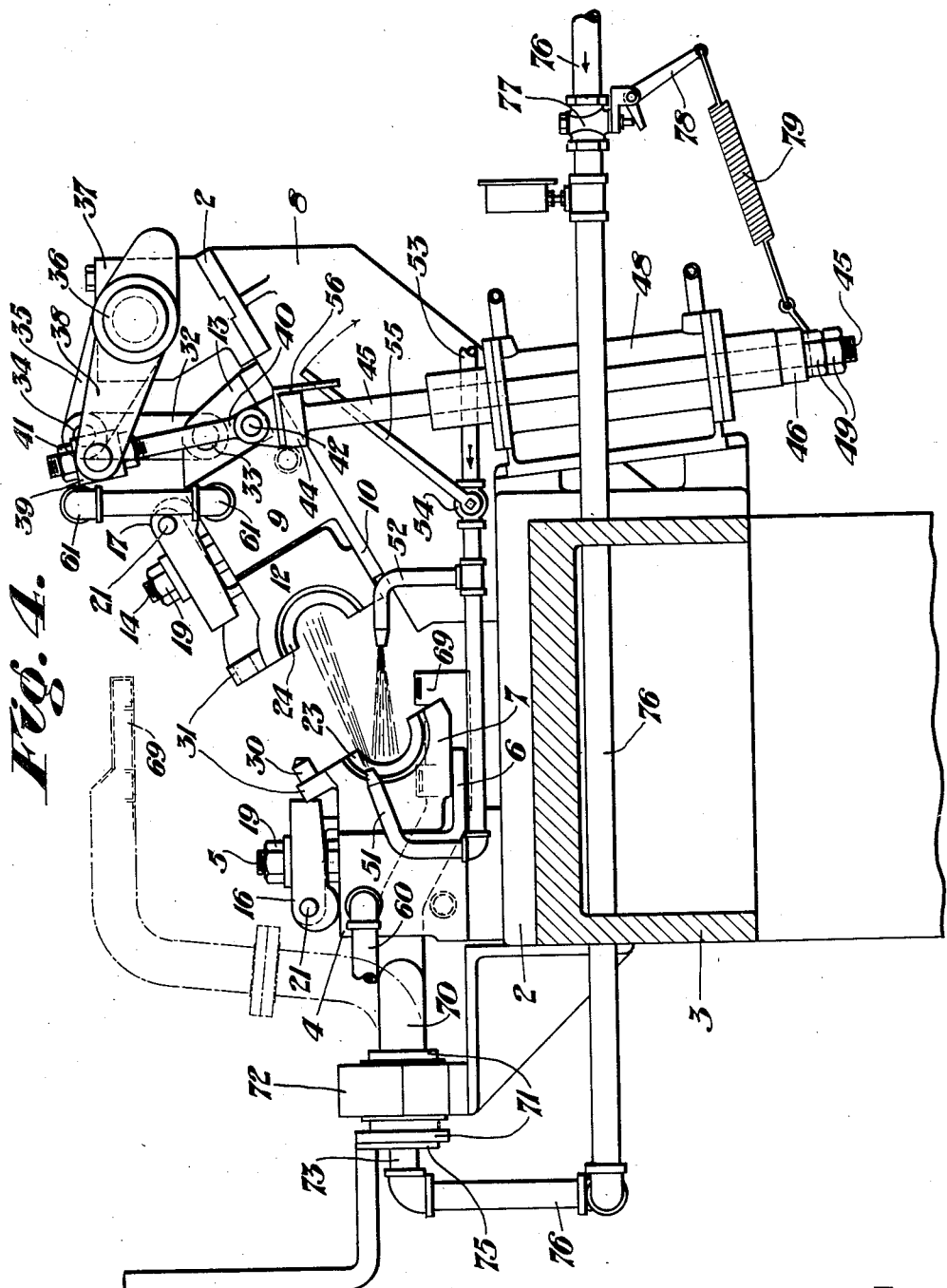

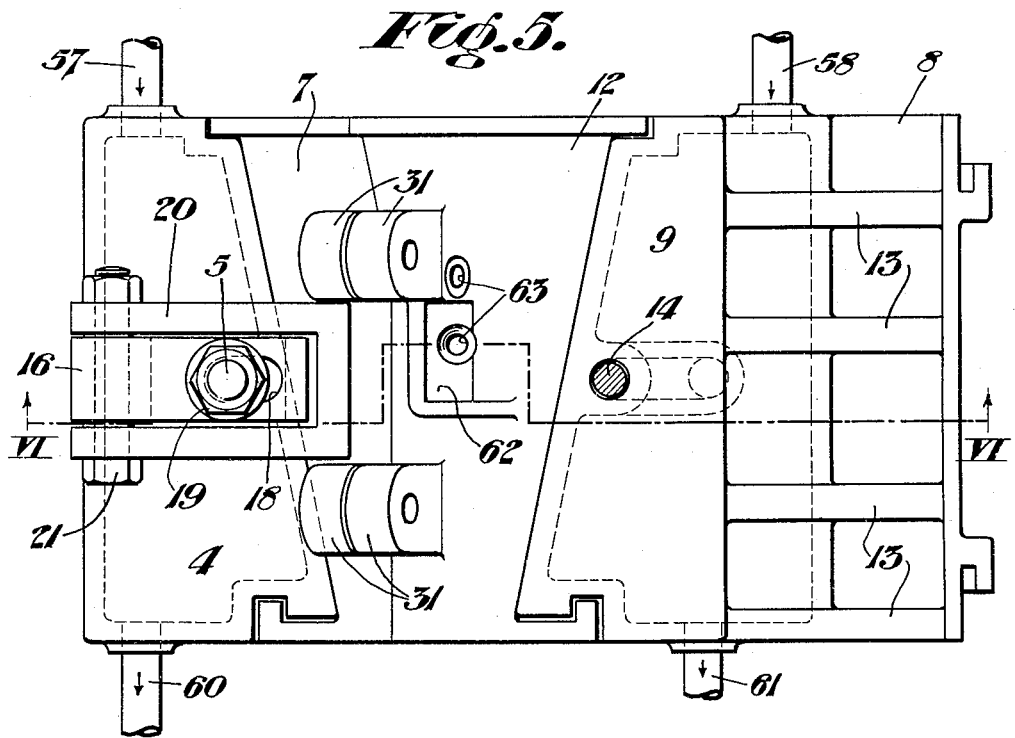
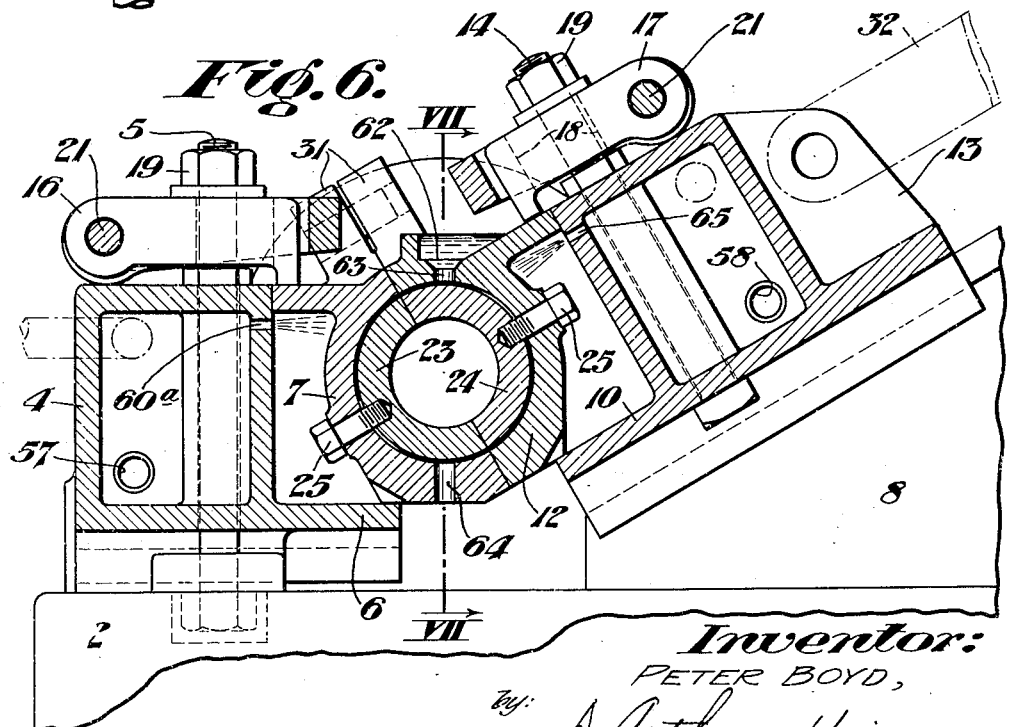

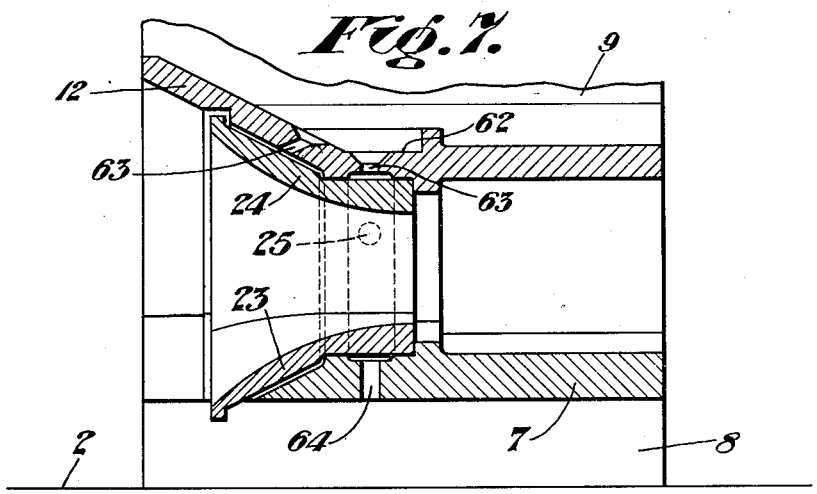
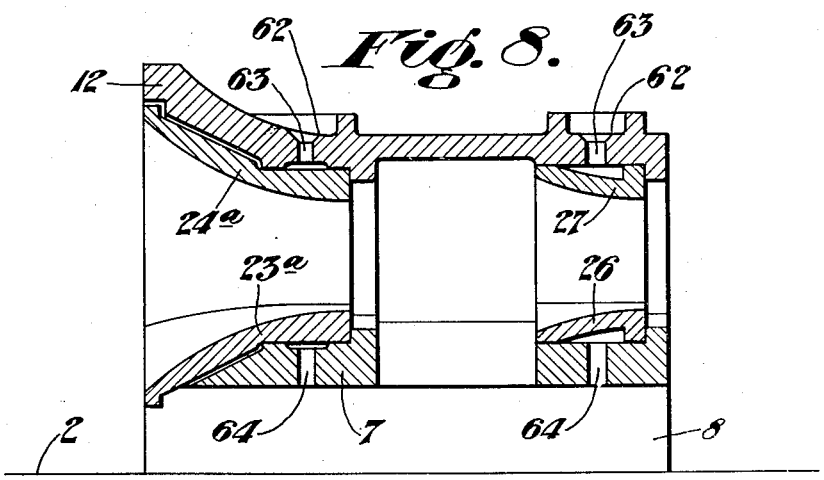
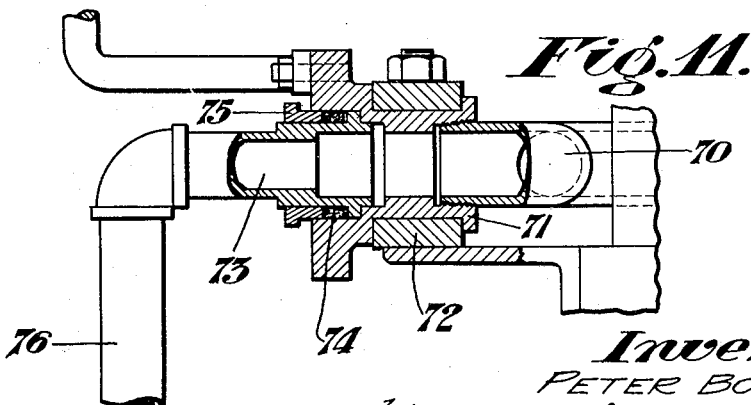

Patented Aug. 16, 1932

1,872,235

UNITED STATES PATENT OFFICE

PETER BOYD, OF BEAVER, PENNSYLVANIA, ASSIGNOR TO NATIONAL TUBE COMPANY, A CORPORATION OF NEW JERSEY

APPARATUS FOR MAKING BUTT-WELD PIPE

Application filed August 23, 1928. Serial No. 301,676.

This invention relates to bending and welding apparatus for forming butt-weld tubes, and has for its object the provision of a novel form of such apparatus in which the bending and welding dies are fixed in position and are used continuously, as contrasted with the apparatus now generally used in which the bending and welding dies or bell are removed after each tube is formed and are then manually cleaned and cooled for reuse.

Another object is to provide means for cooling the backs of the bending and welding dies as the tubes are being formed.

Another object is to provide means for automatically cleaning and cooling the bending and welding dies after each tube is formed.

Another object is to provide split bending and welding dies adapted to be opened or separated after each tube is formed so as to facilitate the automatic cleaning thereof, permit inspection of the dies, and permit the operator to readily lay his tongs in the dies in readiness to draw the next tube.

A further object is to provide a novel means for delivering a jet of air or other gaseous fluid to the edges of the skelp as the tube is being welded so as to raise the temperature thereof and form a better weld.

A still further object is to provide an apparatus of the class described, having the novel design, construction and combination of parts hereinafter described and illustrated in the accompanying drawings.

In the drawings:

Figure 2 is an elevation of the opposite end thereof.

Figure 3 is a front side elevation thereof.

Figure 4 is a similar view showing the dies open.

Figure 5 is an enlarged plan view of the dies and die holders.

Figure 6 is a vertical sectional elevation taken on the line VI—VI of Figure 5.

Figure 7 is a longitudinal sectional elevation through the dies taken on the line VII—VII of Figure 6.

Figure 8 is a similar view showing a slightly modified form of die.

Figure 9 is a view similar to Figure 6 showing a modified form of die and die holder combined.

Figure 10 is a sectional elevation taken on the line X—X of Figure 9.

Figure 11 is an enlarged sectional detail of the gaseous fluid nozzle mounting.

Figure 1:
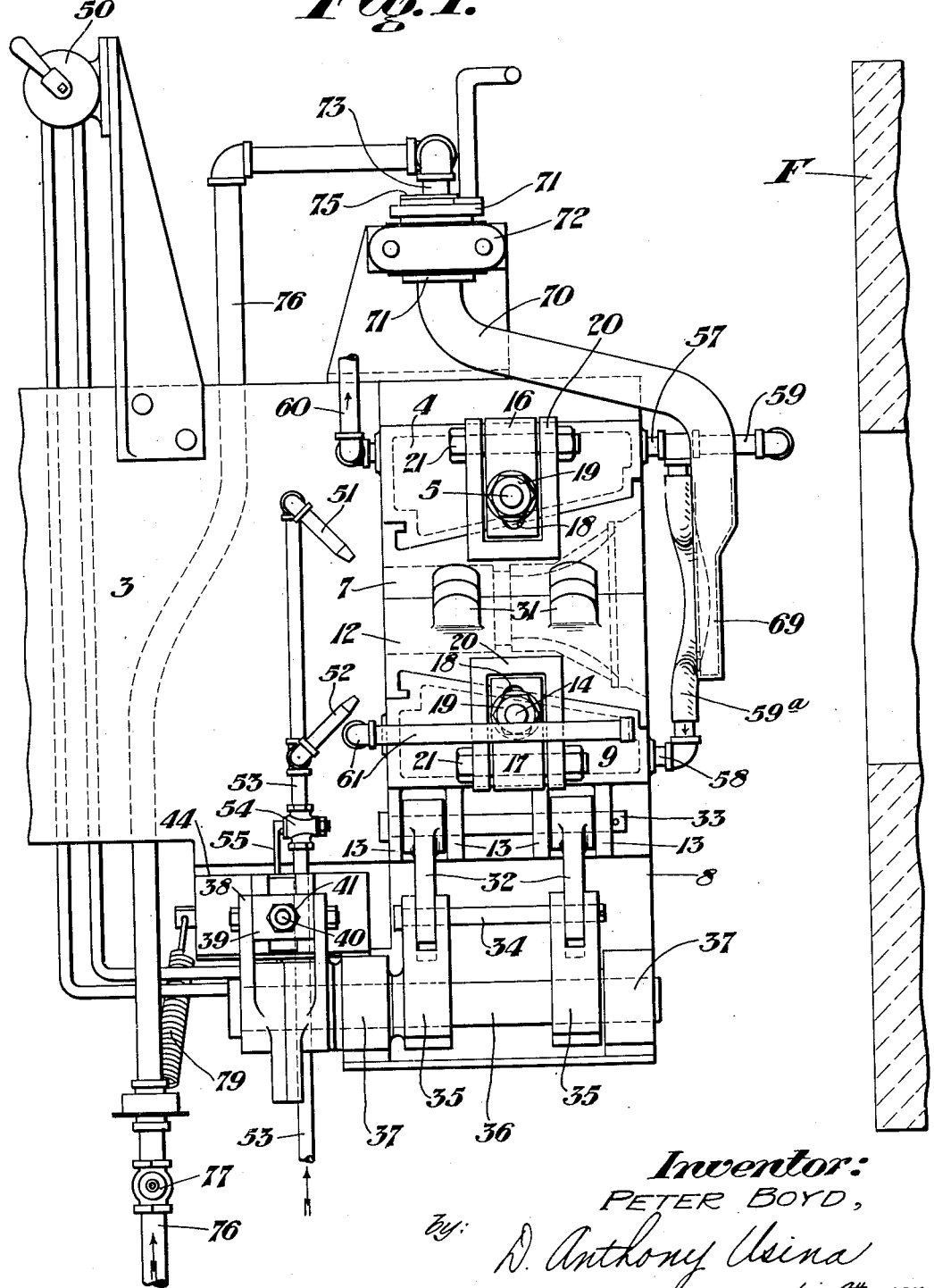
Figure 1 is an end elevation of a bending and welding apparatus constructed in accordance with this invention.

Referring more particularly to the drawings, the numeral 2 designates the main frame of the apparatus which is adapted to be secured to the draw-bench 3 at the furnace end thereof. The furnace is designated by the letter F. A hollow casting 4 forming a water-back is mounted on the frame 2 and is secured in position by a bolt 5 which projects above the top face of the casting. The casting 4 is provided with a horizontal shelf-like projection 6 on which a die-holder part 7 is mounted.

The main frame 2 is provided with an upwardly inclined guideway portion 8 opposite the casting 4 and die-holder part 7 on which a second hollow casting 9 forming a water-back is slidably mounted. The casting 9 is provided at its forward lower edge with a horizontal shelf 10 on which a second die-holder part 12 is mounted, and is also provided on its rear side with pairs of spaced wings 13 to which operating means, to be described, is connected. A bolt 14 is mounted in the casting 9 and projects above its top face.

The die-holder parts 7 and 12 combine to form a complete die-holder and the dividing line of the parts is at an angle to both the horizontal and vertical axis of the die-holder, so as not to be in line with the weld line of the tube and so as to permit the part 12 to be moved out of line with the part 7.

The die-holder parts 7 and 12 are removably secured in position on the castings 4 and 9, respectively, by clamp members 16 and 17, respectively, which are loosely fulcrumed on the bolts 5 and 14. The clamps 16 and 17 are slotted, as at 18, to receive the bolts 5 and 14 and are held against vertical displacement by nuts 19 threaded on the upper ends of the bolts.

The clamps 16 and 17 are adapted to be forced against the die-holders by U-shaped cam members 20 which are pivotally mounted on pins 21 carried by the outer ends of the cam members.

It will be understood that any other suitable clamping or locking mechanism may be substituted for the clamps 16 and 17, if desired.

After the die-holders are mounted in position, the clamps 16 and 17 will be adjusted relative to the bolts 5 and 14, respectively, so as to overlie the die-holders, and the cam members 20 will be rocked on the pins 21 so as to force the cam member against the castings 4 and 9, thus forcing the outer ends of the clamps upwardly and the inner ends downwardly into engagement with the die-holders. By raising the free ends of the cam members 20 the cams will be released from engagement with the castings 4 and 9 and the clamps will be released so as to free the die-holders.

A two-part bending and welding die, which is divided along its longitudinal axis to form parts 23 and 24, is provided for bending and welding the tube skelp. The die parts 23 and 24 are mounted in the die-holders 7 and 12, respectively, and are secured in position by tap screws 25.

In Figure 8 I have shown a slightly modified die construction in which two dies are provided, the foremost die being similar to the single die, above described, and being divided along its longitudinal axis to form parts 23ª and 24ª which are mounted in the die-holders at their furnace or forward end. The second die, which is also divided along its longitudinal axis to form parts 26 and 27, is secured in the die-holders adjacent their rear end. The foremost die parts 23ª and 24ª combine to form a combined bending and welding die, while the rear die parts 26 and 27 combine to form a further welding and reducing die.

In Figure 10 I have shown a still further modified form of die in which the die and die-holder parts are combined in one unit and secured directly to the castings 4 and 9 by the clamps 16 and 17. In this construction the die is divided along its longitudinal axis to form two parts 28 and 29, which are carried by the castings 4 and 9, respectively, and are clamped in position by the clamps 16 and 17.

The die-holder parts 7 and 12 are provided with dowel-pins and dowel-lugs 30 and 31, respectively, and the combined die and die-holder parts 28 and 29 are provided with dowel pins and dowel pin lugs 30ª and 31ª, respectively, for assuring alinement of the parts.

In order to reciprocate the water-back or casting 9, and the die-holder and die part carried thereby, the following operating mechanism is provided.

A pair of links 32 are pivotally connected at one end to a pin 33 carried by the wings 13 on the water-back or casting 9, and the other ends of the links 32 are pivotally connected to a pin 34 mounted in the slotted ends of crank arms 35 of a crank-shaft 36. The shaft 36 is journaled in bearings 37 on the main frame 2 and is provided at one end with a crank arm 38 which is provided at its outer end with a swivel block 39. The block 39 is apertured to receive the upper end of a link 40 which is adjustably held in the block by nuts 41. The lower end of the link 40 is pivotally mounted on a pin 42 carried by ears 43 of a cross-head 44. The cross-head 44 is secured to the upper ends of a pair of guide-rods 45, which rods have their lower ends connected to a cross-head 46 carried by a piston rod 47 of an air cylinder 48. The cross-heads 44 and 46 are adapted to be adjusted longitudinally of the guide-rods 45 by nuts 49 so as to limit the stroke of the cylinder 48, and a link 40 is adapted to be adjusted relative to the block 39 so as to adjust the movement of the water-back or casting 9.

The cylinder 48 is adapted to be controlled by a manually operated valve 50 located adjacent to the welder's side of the apparatus.

A pair of water spray nozzles 51 and 52 are provided at the forward end of the die-holder parts and to each side of the path of travel of the tube being welded. The spray nozzles 51 and 52 are directed inwardly on an angle so as to direct a water spray on the die part carried by the opposite die-holder part when the die-holder is in open or inoperative position. A water supply pipe 53 extends along the forward side of the apparatus and connects with the nozzles 51 and 52. The pipe 53 extends from a point adjacent the cylinder 48 and is provided with a control valve 54 which has an operating lever 55. The operating lever 55 is connected to a bracket 56, carried by the cross-head 44, and is adapted to be moved to open position when the cylinder 48 is operated to open or separate the die-holder parts, and to be moved to closed position when the die-holder parts are closed.

The water-backs or castings 4 and 9 are provided with water inlet openings in their rear or furnace ends adjacent the bottoms thereof, and water inlet pipes 57 and 58 are connected to the inlet openings in the respective castings. The pipes 57 and 58 are connected to a water supply pipe 59. The pipe 58 is connected to the pipe 57 by a flexible conduit 59ª so as to permit the water-back 9 to reciprocate.

The water-back or casting 4 has an outlet opening in its end wall opposite the inlet opening and adjacent the top thereof, and a drain conduit or pipe 60 is connected in the outlet opening so as to provide for a flow of water therethrough.

The side wall of the water-back or casting 4, adjacent the die-holder part 7, is provided with a plurality of spray holes 60ª adjacent its top so as to permit water to spray from the water-back 4 onto the back of the die-holder part.

The water-back 9 has an outlet opening in its end wall opposite the inlet opening and adjacent the top thereof, and an overflow conduit 61 is connected in the outlet and extends up over the top and parallel with the water-back. The conduit 61 is provided with a series of holes in its wall toward the stationary water-back or casting 4 and is adapted to spray the overflow water over the top of the die-holder parts and into a trough 62 formed on the top of the die-holder part 12. A plurality of apertures 63 are formed through the die-holder part 12 along the bottom of the trough 62 and permit the water collected in the trough to flow through and against the back of the die parts 23 and 24. The water thus flowing onto the backs of the die parts 23 and 24 will flow around the backs of the die parts and drain out through openings 64 in the die-holder part 7.

The side wall of the water-back or casting 9 adjacent the die-holder part 12 is provided with a plurality of spray holes 65 adjacent its top so as to permit water to spray from the water-back 9 onto the back of the die-holder part 12.

The water is continually flowing through and spraying from the water-backs or castings 4 and 9 and serves to maintain the die-holder parts and die parts relatively cool. However, after a tube has been drawn through the apparatus, the dies are materially heated and they are then cooled when the die-holder and die parts are separated by the spray from the spray nozzles 51 and 52. The spray from the nozzles 51 and 52 also serves to clean or wash off all scale and the like which has adhered to the die parts 23 and 24.

It will be understood that, if desired, any number of spray nozzles similar to the nozzles 51 and 52 may be provided so as to quickly and efficiently cool and clean the die parts 23 and 24.

It has been found that the die parts of this invention materially outwear the dies ordinarily used, and such increased wear is thought to be due, at least in part, to the fact that the die parts are kept cooler than is possible with the old method and also to the fact that the die parts are alternately heated by the tube and cooled by the water sprays so as to constantly retemper the metal.

A bosh 67 is provided below the apparatus to receive all drain or overflow from the various water cooled parts and this bosh, which is standard equipment, is also used by the welder to cool his tongs.

In order to facilitate and improve the weld formed by the die parts, I have provided a nozzle 69 for delivering a jet or jets of air or other gaseous fluids into the die and onto the edges of the hot skelp as it is being bent and welded by the die. The nozzle 69 forms a continuation of a normally horizontal pipe 70 which is shaped so as to lie along the welder's side of the apparatus and across the back of the apparatus below the skelp. The forward end of the pipe 70 is threaded into a rotary sleeve 71 mounted in a bearing 72 on the main frame 2. An inlet fitting 73 is fitted in a stuffing box formed in the end of the sleeve opposite the pipe 70 and is secured in position by packing 74 and an adjustable gland 75. A gaseous fluid supply pipe 76 is connected with the fitting 73 and extends across the front of the apparatus to a suitable source of supply of gaseous fluid (not shown). The gaseous fluid nozzle 69 when in operative position is located directly in front of the skelp heating furnace and, therefore, it may be necessary or desirable in some instances to water cool this nozzle. Any well known method of water cooling may be used.

The pipe 76 has a valve 77 connected therein intermediate its ends for controlling the flow of gaseous fluid to the nozzle 69. The valve 77 has its operating lever 78 connected by a spring 79 with the lower cross-head 46 of the air cylinder 48 operating mechanism and is adapted to be automatically opened when the cylinder 48 is operated to close the die-holder and die parts, and to be automatically closed by the pressure of the fluid when the cylinder is reversed to separate the die-holder and die parts.

The operation of the apparatus will be readily understood by reading the above description. Briefly, the cylinder 48 will be first operated to open or separate the die-holder and die parts, the welder will then grasp the end of a piece of skelp in the furnace with the usual tongs and will lay the tongs in the stationary die part. The valve 50 will then be operated to reverse the cylinder 48 and close or bring together the die-holder and die parts. The valve 77 will be automatically opened as the cylinder 48 operates to bring the die-holder and die parts together, so that air or other gaseous fluid will be projected into the die and onto the edges of the skelp by the nozzle 69 to intensify the heat of the edges of the skelp.

The tongs and skelp will be pulled through the die by the usual chain and the tube will thus be formed.

After the tube is formed the welder will reverse the valve 50 so as to operate the cylinder 48 and separate the die-holder and die parts. This operation of the cylinder will automatically release the valve 77 so as to shut off the supply of gaseous fluid and will also open the valve 54 so as to admit water to the sprays 51 and 52 which will shower water onto the interior of the die parts to cool and clean the die parts.

When the cylinder is again operated to close or bring the die-holder and die parts together, the valve 54 will be closed and the flow of water to the sprays will be stopped.

The pipe 70 carrying the nozzle 69 is adapted to be rotated or swung forwardly when desired to bring the nozzle to the front of the apparatus for cleaning or repairs.

While I have shown and described one specific form of my invention, I do not wish to be limited thereto, since various changes and modifications may be made without departing from the scope of my invention as defined in the appended claims.

I claim—

1. In a bending and welding apparatus for forming butt-weld pipe, a main frame, a water-back member fixedly mounted on said frame, a second water-back member slidably mounted on said frame for movement toward and away from said first named water-back, a die-holder part removably clamped to said first named water-back, a second die-holder part removably clamped to said second named water-back, die elements removably secured in said die-holders, means for continuously supplying water to said water-backs, means for continuously directing water sprays from said water-backs against said die-holders, other means for spraying water on the working faces of said dies only when said dies are open, and means for directing a jet of gaseous fluid on the pipe being welded.

2. In a bending and welding apparatus for forming butt-weld pipe, a pair of hollow water-backs, one of said backs being fixed and the other of said backs being movable toward and away from said fixed back, a two-part die-holder, said die-holder being divided on a line extending longitudinally of the holder and on an angle to the horizontal and vertical axis thereof, one part of said die-holder being removably secured to said fixed water-back and the other part of said die-holder being removably secured to said movable water-back, apertures in said water-backs adapted to direct sprays of water against the backs of said die-holders, dies removably secured in said holders, and means for spraying water on the faces of said dies only when said die-holders are in open position.

3. In a bending and welding apparatus for forming butt-weld pipe, a base, a water-cooled back member mounted on said base, a die-holder mounted on said water-cooled back member, a bolt extending through said water-cooled back for securing said back to said base, a clip member fulcrumed on said bolt and overlying said back and said die-holder, and a cam member pivotally mounted on the rear end of said clip member overlying said back, said cam being adapted to be rotated to lift the rear end of said clip and force the forward end of said clip into engagement with said die-holder to lock said die-holder in position.

4. In a bending and welding apparatus for forming butt-weld pipe, a two-part die-holder, at least one of said die-holder parts being movable toward and away from the other part, die elements guided by said holder parts, means for moving said movable part of said die-holder, means for spraying cooling liquid on the backs of said die-holder parts to prevent overheating of said die elements and die-holder parts, other means for spraying cooling liquid on the working faces of the die elements, and means for automatically controlling the flow of said cooling liquid to said die elements so that said liquid will be sprayed only when said die holder is in open position.

5. In a bending and welding apparatus for forming butt-weld pipe, a two-part die-holder, at least one of said die-holder parts being movable toward and away from the other part, die elements guided by said holder parts, means for moving said movable part of said die-holder, means for constantly spraying cooling liquid on said die-holder parts to prevent overheating of said die elements and die-holder parts, other means for spraying cooling liquid on the working faces of the die elements, means for projecting a jet of gaseous fluid onto the edges of the pipe being welded as said pipe is being drawn through the die elements, and means for automatically controlling the flow of said cooling liquid to said die elements and said gaseous fluid so that said cooling liquid will be sprayed only when said die-holder is in closed position and said gaseous fluid will be projected into the dies and onto the pipe edges only when said die-holder is in closed position.

6. In a bending and welding apparatus for forming butt-weld pipe, a two-part die holder, at least one of said die-holder parts being movable toward and away from the other part, die elements carried by said holder parts, means for moving said movable part of said die-holder, means for continuously circulating cooling liquid in the die holder and spraying it thereagainst, other means for spraying cooling liquid on the working faces of the die elements and means for automatically controlling the flow of said cooling liquid to said die elements so that said liquid will be sprayed only when said die holder is in open position.

7. In a bending and welding apparatus for forming butt-weld pipe, a two-part die holder, at least one of said die holder parts being movable toward and away from the other part, die elements carried by said holder parts, means for moving said movable part of said die holder, means for continuously circulating cooling liquid in the die holder and spraying it thereagainst, other means for spraying cooling fluid on the working faces of the die elements, means for projecting a jet of gaseous fluid onto the edges of the pipe being welded as said pipe is being drawn through the die elements, and means for automatically controlling the flow of said cooling liquid to said die elements and said gaseous fluid so that said cooling liquid will be sprayed on said die elements only when said die holder is in open position and said gaseous fluid will be projected into the dies and onto the pipe edges only when said die holder is in closed position.

8. In a bending and welding apparatus for forming butt-weld pipe, a two-part die-holder, at least one of said die holder parts being movable toward and away from the other part, die elements carried by said holder parts, means for moving said movable part of said die-holder, means for continuously circulating cooling liquid in the die-holder and spraying it thereagainst, other means for spraying cooling liquid on the working faces of the die elements only when said die-holder is in open position, means for projecting a jet of gaseous fluid into the dies and onto the edges of the pipe being welded as said pipe is drawn through the die elements and while said die-holder is closed, and means operable by said die-holder operated means for controlling the flow of said cooling liquid to said die elements and said gaseous fluid.

9. In a bending and welding apparatus for forming butt-weld pipe, a two-part die-holder, at least one of said die-holder parts being movable toward and away from the other part, die elements carried by said holder parts, fluid pressure means for moving said movable part of said die-holder, manually operable control means for said fluid pressure means, means for continuously circulating cooling liquid in the die-holder and spraying it thereagainst, other means for spraying cooling liquid on the working faces of the die elements only when said die-holder is in open position, means for projecting a jet of gaseous fluid into the dies and onto the edges of the pipe being welded as said pipe is being drawn through the die elements while said die-holder is closed and separate control means for controlling the spray of said cooling liquid and gaseous fluid, said control means each being automatically operable by said fluid pressure means for moving said movable part of said die-holder.

In testimony whereof, I have hereunto set my hand.

PETER BOYD.